United States Patent
Daniel et al.

(10) Patent No.: US 10,891,383 B2
(45) Date of Patent: Jan. 12, 2021

(54) VALIDATING COMPUTER RESOURCE USAGE

(71) Applicant: British Telecommunications Public Limited Company, London (GB)

(72) Inventors: Joshua Daniel, London (GB); Theo Dimitrakos, London (GB); Gery Ducatel, London (GB)

(73) Assignee: British Telecommunications Public Limited Company, London (GB)

( * ) Notice: Subject to any disclaimer, the term of this patent is extended or adjusted under 35 U.S.C. 154(b) by 42 days.

(21) Appl. No.: 15/548,654

(22) PCT Filed: Feb. 10, 2016

(86) PCT No.: PCT/EP2016/052865
§ 371 (c)(1),
(2) Date: Aug. 3, 2017

(87) PCT Pub. No.: WO2016/128491
PCT Pub. Date: Aug. 8, 2016

(65) Prior Publication Data
US 2018/0025166 A1    Jan. 25, 2018

(30) Foreign Application Priority Data
Feb. 11, 2015 (EP) .................................... 15275030

(51) Int. Cl.
*G06F 12/14* (2006.01)
*G06F 21/60* (2013.01)
(Continued)

(52) U.S. Cl.
CPC .......... *G06F 21/602* (2013.01); *G06F 9/5011* (2013.01); *G06Q 10/06* (2013.01)

(58) Field of Classification Search
CPC ... G06F 21/64; G06F 21/6245; H04L 63/0435
(Continued)

(56) References Cited

U.S. PATENT DOCUMENTS 6,192,405 B1    2/2001    Bunnell
7,716,739 B1    5/2010    McCorkendale
(Continued)

FOREIGN PATENT DOCUMENTS

EP    2381363 A2    10/2011
EP    2101599 B1    9/2013
(Continued)

OTHER PUBLICATIONS

Dev, Bitcoin Mining Acceleration and Performance Quantification, IEEE, May 7, 2014, pp. 1-6.*
(Continued)

*Primary Examiner* — Alexander Lagor
*Assistant Examiner* — Jenise E Jackson
(74) *Attorney, Agent, or Firm* — Patterson Thuente Pedersen, P.A.

(57) ABSTRACT

A computer implemented method for validating use of a computing resource by a requester software component including: validating a characteristic of the requester; generating a first transaction defining criteria for consumption of the resource by the requester, the first transaction being encrypted with a private key from a public key/private key pair and being added as part of a block of transactions to a blockchain data structure; generating a subsequent encrypted transaction corresponding to a request of the requester to consume the resource, the subsequent transaction referring to the first transaction, wherein the subsequent transaction is validated by a transaction miner computing component from a plurality of miners by authenticating the
(Continued)

transaction using the public key and verifying compliance with the criteria defined in each transaction.

13 Claims, 4 Drawing Sheets

(51) Int. Cl.
*G06Q 10/06* (2012.01)
*G06F 9/50* (2006.01)

(58) Field of Classification Search
USPC .......................................................... 713/189
See application file for complete search history.

(56) References Cited

U.S. PATENT DOCUMENTS

| | | |
|---|---|---|
| 7,797,748 B2 | 9/2010 | Zheng et al. |
| 7,870,153 B2 | 1/2011 | Croft et al. |
| 8,271,974 B2 | 9/2012 | Mazhar et al. |
| 8,375,437 B2 | 2/2013 | Linsley et al. |
| 8,479,294 B1 | 7/2013 | Li et al. |
| 8,516,241 B2 | 8/2013 | Chang et al. |
| 8,739,155 B2 | 5/2014 | Hehir et al. |
| 9,009,825 B1 | 4/2015 | Chang et al. |
| 9,183,378 B2 | 11/2015 | Banerjee et al. |
| 9,235,813 B1 | 1/2016 | Qian et al. |
| 9,466,051 B1 | 10/2016 | Roth et al. |
| 9,495,668 B1* | 11/2016 | Juels ................... G06Q 20/06 |
| 9,807,106 B2 | 10/2017 | Daniel et al. |
| 2002/0100035 A1 | 7/2002 | Kenyon et al. |
| 2002/0120725 A1 | 8/2002 | DaCosta et al. |
| 2003/0084349 A1 | 5/2003 | Friedrichs et al. |
| 2003/0204644 A1 | 10/2003 | Vincent |
| 2004/0015977 A1† | 1/2004 | Benke et al. |
| 2004/0268296 A1 | 12/2004 | Kayam et al. |
| 2005/0091269 A1 | 4/2005 | Gerber et al. |
| 2006/0282660 A1 | 12/2006 | Varghese et al. |
| 2009/0254499 A1 | 10/2009 | Deyo |
| 2010/0011029 A1 | 1/2010 | Niemelae |
| 2010/0262873 A1 | 10/2010 | Chang et al. |
| 2011/0197070 A1 | 8/2011 | Mizrah |
| 2011/0265154 A1 | 10/2011 | Furlan et al. |
| 2012/0053925 A1 | 3/2012 | Geffin et al. |
| 2012/0215727 A1 | 8/2012 | Malik et al. |
| 2012/0246290 A1 | 9/2012 | Kagan |
| 2012/0284794 A1 | 11/2012 | Trent et al. |
| 2012/0304007 A1 | 11/2012 | Hanks et al. |
| 2012/0311526 A1 | 12/2012 | Deanna et al. |
| 2013/0006949 A1 | 1/2013 | Essawi et al. |
| 2013/0304923 A1† | 11/2013 | Clay et al. |
| 2014/0067734 A1 | 3/2014 | Hawkins et al. |
| 2014/0164251 A1 | 6/2014 | Loh |
| 2014/0180738 A1 | 6/2014 | Phillipps et al. |
| 2014/0215490 A1 | 7/2014 | Mathur et al. |
| 2014/0298011 A1 | 10/2014 | Ganesan |
| 2014/0344015 A1 | 11/2014 | Puértolas-Montañés et al. |
| 2014/0358825 A1 | 12/2014 | Phillipps et al. |
| 2014/0372346 A1 | 12/2014 | Phillipps et al. |
| 2015/0120567 A1 | 4/2015 | Van Rooyan et al. |
| 2015/0134606 A1 | 5/2015 | Magdon-Ismail et al. |
| 2015/0227741 A1 | 8/2015 | Permeh et al. |
| 2015/0271318 A1 | 9/2015 | Antos et al. |
| 2015/0332283 A1 | 11/2015 | Witchey |
| 2015/0332395 A1* | 11/2015 | Walker ................... G06Q 20/06 705/69 |
| 2015/0356523 A1 | 12/2015 | Madden |
| 2015/0356555 A1* | 12/2015 | Pennanen ............. G06Q 20/06 705/71 |
| 2015/0363876 A1* | 12/2015 | Ronca ................... G06Q 40/04 705/37 |
| 2015/0379423 A1 | 12/2015 | Dirac et al. |
| 2016/0048771 A1 | 2/2016 | Chen et al. |
| 2016/0057041 A1 | 2/2016 | Gupta et al. |
| 2016/0078367 A1 | 3/2016 | Adjaoute |
| 2016/0086175 A1 | 3/2016 | Finlow-Bates et al. |
| 2016/0098730 A1 | 4/2016 | Feeney |
| 2016/0164884 A1* | 6/2016 | Sriram, Sr. ...... G06Q 10/06315 705/51 |
| 2016/0221186 A1 | 8/2016 | Perrone |
| 2016/0260095 A1 | 9/2016 | Ford |
| 2016/0283920 A1 | 9/2016 | Fisher et al. |
| 2016/0321654 A1* | 11/2016 | Lesavich ............. G06F 16/9554 |
| 2016/0350173 A1 | 12/2016 | Ahad |
| 2017/0063886 A1 | 3/2017 | Muddu et al. |
| 2017/0109735 A1 | 4/2017 | Sheng et al. |
| 2017/0116403 A1† | 4/2017 | Bouse et al. |
| 2017/0124534 A1* | 5/2017 | Savolainen ........ G06Q 20/4016 |
| 2017/0279774 A1 | 9/2017 | Booz et al. |
| 2017/0279818 A1 | 9/2017 | Milazzo et al. |
| 2017/0286136 A1 | 10/2017 | Dimitrakos et al. |
| 2017/0295023 A1* | 10/2017 | Madhavan ............ H04L 9/3247 |
| 2017/0352012 A1* | 12/2017 | Hearn ................... G06Q 20/065 |
| 2017/0372392 A1* | 12/2017 | Metnick ............... G06Q 30/018 |
| 2018/0025166 A1 | 1/2018 | Daniel et al. |
| 2018/0144114 A1* | 5/2018 | Fiske ................... H04L 9/3239 |
| 2018/0225466 A1 | 8/2018 | Ducatel et al. |
| 2018/0225469 A1 | 8/2018 | Daniel et al. |
| 2018/0225611 A1 | 8/2018 | Daniel et al. |
| 2018/0232526 A1* | 8/2018 | Reid ..................... G06F 21/602 |
| 2018/0285585 A1 | 10/2018 | Daniel et al. |
| 2019/0036895 A1 | 1/2019 | Irvine |
| 2019/0050541 A1 | 2/2019 | Wright et al. |
| 2019/0139136 A1 | 5/2019 | Molinari et al. |

FOREIGN PATENT DOCUMENTS

| | | |
|---|---|---|
| EP | 2816469 A1 | 12/2014 |
| EP | 3101599 A2 | 12/2016 |
| GB | 2540976 A | 2/2017 |
| GB | 2540977 A | 2/2017 |
| WO | WO-0184285 A2 | 11/2001 |
| WO | WO-2012117253 A1 | 9/2012 |
| WO | WO-2013172750 A1 | 11/2013 |
| WO | WO-2015128612 A1 | 9/2015 |
| WO | WO-2015179020 A2 | 11/2015 |
| WO | WO-2016034496 A1 | 3/2016 |
| WO | WO-2016077127 A1 | 5/2016 |
| WO | WO-2016191639 A1 | 12/2016 |
| WO | WO-2017054985 A1 | 4/2017 |
| WO | WO-2017167547 A1 | 10/2017 |
| WO | WO-2017167548 A1 | 10/2017 |
| WO | WO-2017167549 A1 | 10/2017 |
| WO | WO-2017167550 A1 | 10/2017 |
| WO | WO-2018178026 | 10/2018 |
| WO | WO-2018178034 | 10/2018 |
| WO | WO-2018178035 | 10/2018 |
| WO | WO-2018206374 | 11/2018 |
| WO | WO-2018206405 | 11/2018 |
| WO | WO-2018206406 | 11/2018 |
| WO | WO-2018206407 | 11/2018 |
| WO | WO-2018206408 | 11/2018 |
| WO | WO 2018228950 | 12/2018 |
| WO | WO 2018228951 | 12/2018 |
| WO | WO 2018228952 | 12/2018 |
| WO | WO 2018228973 | 12/2018 |
| WO | WO 2018228974 | 12/2018 |

OTHER PUBLICATIONS

Application and Filing Receipt for U.S. Appl. No. 15/223,261, filed Jul. 29, 2016, Inventor(s): Daniel et al.
Application and Filing Receipt for U.S. Appl. No. 15/749,289, filed Jan. 31, 2018, Inventor(s): Ducatel et al.
Application and Filing Receipt for U.S. Appl. No. 15/749,338, filed Jan. 31, 2018, Inventor(s): Daniel et al.
Application and Filing Receipt for U.S. Appl. No. 15/749,391, filed Jan. 31, 2018, Inventor(s): Daniel et al.
Application and Filing Receipt for U.S. Appl. No. 15/939,650, filed Mar. 29, 2018, Inventor(s): Daniel et al.
Hawkins et al., in "On Intelligence, How a New Understanding of the Brain Will Lead to the Creation of Truly Intelligent Machines" (2004, Times Books, ISBN 0-8050-7456-2); 174 pages.

(56) References Cited

OTHER PUBLICATIONS

Numenta in "Hierarchical Temporal Memory including HTM Cortical Learning Algorithms"; Version 0.2.1, (Numenta, Sep. 12, 2011); 68 pages.
Numenta in "Biological and Machine Intelligence (BAMI)—A living book that documents Hierarchical Temporal Memory (HTM)" (Numenta, Inc., Mar. 8, 2017) (retrieved Mar. 28, 2018) available from https://numenta.com/assets/pdf/biological-and-machine-intelligence/BAMI-Complete.pdf ; 69 pages.
Billaudelle, et al.; "Porting HTM Models to the Heidelberg Neuromorphic Computing Platform" May 2015) available from Cornell University Library (citation arXiv:1505.02142) and https://arxiv.org/pdf/1505.02142.pdf (retrieved Mar. 28, 2018); Kirchhoff-Institute for Physics, Heidelberg, Germany, Numenta, Inc., Redwood City, CA; 9 pages.
Purdy, Scott; "Encoding Data for HTM Systems" (Feb. 2016) available from Cornell University Library (citation arXiv:1602.05925) and https://arxiv.org/ftp/arxiv/papers/1602/1602.05925.pdf; Numenta, Inc., Redwood City, California, USA; (retrieved Mar. 28, 2018); 11 pages.
Ahiviad et al., "How Do Neurons Operate on Sparse Distributed Representations? A Mathematical Theory of Sparsity, Neurons and Active Dendrites" (Jan. 2016) available from Cornell University Library (citation arXiv:1601.00720) and https://arxiv.org/ftp/arxiv/papers/1601/1601.00720.pdf (retrieved Mar. 28, 2018); Numenta, Inc., Redwood City, CA, USA; 23 pages.
Ahiviad et al., "Real-Time Anomaly Detection for Streaming Analytics" (Jul. 8, 2016) available from Cornell University Library (citation arXiv:1607.02480) and https://arxiv.org/pdf/1607.02480.pdf (retrieved Mar. 28, 2018); Numenta, Inc., Redwood City, CA, USA; 10 pages.
Lavin et al., "Evaluating Real-time Anomaly Detection Algorithms—the Numenta Anomaly Benchmark" (Oct. 9, 2015) available from Cornell University Library (citation arXiv:1510.03336) and https://arxiv.org/ftp/arxiv/papers/1510/1510.03336.pdf (retrieved Mar. 28, 2018); Numenta, Inc., Redwood City, CA, USA; 8 pages.
Cui et al., "The HTM Spatial Pooler: A Neocortical Algorithm for Online Sparse Distributed Coding" (Feb. 3, 2017) available from Cold Spring Harbor Laboratory bioRxiv (citation doi.org/10.1101/085035) and https://www.biorxiv.org/content/biorxiv/early/2017/02/16/085035.full.pdf (retrieved Mar. 28, 2018); Numenta, Inc., Redwood City, CA, USA; 16 pages.
Cui et al., "Continuous Online Sequence Learning with an Unsupervised Neural Network Model" (Nov. 2016) published in Published in Neural Computation (Nov. 2016, vol. 28. No. 11) and available from https://www.mitpressjournals.org/doi/pdf/10.1162/NECO_a_00893 (retrieved Mar. 28, 2018); Numenta, Inc., Redwood City, CA, USA; 31 pages.
Hawkins et al., "Why Neurons Have Thousands of Synapses, A Theory of Sequence Memory in Neocortex" (Mar. 30, 2016) published in Frontiers in Neural Circuits (Oct. 1-13, 2016, doi:10.3389/fncir.2016.00023) and available from https://www.frontiersin.org/articles/10.3389/fncir.2016.00023/full (retrieved Mar. 28, 2018); Numenta, Inc., Redwood City, CA, USA; 13 pages.
Numenta; "Sparse Distributed Representations" Numenta, available from https://numenta.com/assets/pdf/biological-and-machine-intelligence/BaMI-SDR.pdf and accessed on Mar. 29, 2017) (retrieved Mar. 28, 2018); 15 pages.
Olshausen et al.; "Sparse Coding with an Overcomplete Basis Set: A Strategy Employed by V1?" (Olshausen, B.A., Field, D.J., 1997, Vision Research, 37:3311-3325) http://www.chaos.gwdg.de/~michael/CNS_course_2004/papers_max/OlshausenField1997.pdf; revised Dec. 24, 1996; (retrieved Mar. 28, 2018); 15 pages.
Shah S Yousaf et al: "Price Based Routing for Event Driven Prioritized Traffic in Wireless Sensor Networks", 2013 IEEE 2nd Network Science Workshop (NSW). IEEE. Apr. 29, 2013 (Apr. 29, 2013). pp. 1-8. XP032487185. DOI: 10.1109/NSW.2013.6609187 ISBN: 978-1-4799-0436-5; Section IV; 8 pages.
Dr Gavin Wood: "Ethereum: A Secure Decentralized Generalized Transaction Ledger Final Draft—Under Review", Jun. 4, 2014 (Jun. 4, 2014), XP055242189, Retrieved from the Internet: URL:http://gavwood.com/paper.pdf; 32 pages.
Meni Rosenfeld "Overview of Colored Coins" (Dec. 4, 2012) https://bravenewcoin.com/assets/Whitepapers/Overview-of-Colored-Coins.pdf 13 pages.
Assia, Y. et al, "Colored Coins Whitepaper" (2015) and available at docs.google.com/document/d/1AnkP_cVZTCMLIzw4DvsW6M8Q2JC01IzrTLuoWu2z1BE) 23 pages.
Ahmad et al., "Properties of Sparse Distributed Representations and their Application to Hierarchical Temporal Memory" (Mar. 24, 2015) available from Cornell University Library (citation arXiv:1503.07469) and https://arxiv.org/ftp/arxiv/papers/1503/1503.07469.pdf (retrieved Mar. 28, 2018); Numenta, Redwood City, CA, USA; 18 pages.
International Search Report and Written Opinion of the International Searching Authority for PCT Application No. PCT/EP2016/067309 dated Nov. 3, 2016; 9 pages.
International Search Report and Written Opinion of the International Searching Authority for PCT Application No. PCT/EP2016/067308 dated Sep. 21, 2016; 8 pages.
Jason Paul Cruz et al: "The Bitcoin Network as Platform for TransOrganizational Attribute Authentication", WEB 2015—The Third International Conference on Building and Exploring Web Based Environments, May 24, 2015 (May 24, 2015), XP055239598, Rome, Italy; 7 pages.
Anonymous: "Can BitCoin be a better DRM? BitcoinBeginners", Feb. 17, 2014 (Feb. 17, 2014), XP055239400, retrieved from: https://www.reddit.com/r/BitcoinBeginners/comments/1y5yh8/can_bitcoin_be_a_better_drm, 3 pages.
Anonymous: "Colored Coins—Bitcoin Wiki", Jul. 7, 2015 (Jul. 7, 2015), (XP055239396 , Retrieved from: https://en.bitcoin.it/w/index.php?title=Colored_Coins&oldid=57259 ; 6 pages.
International Search Report and Written Opinion of the International Searching Authority for PCT Application No. PCT/EP2016/067310 dated Sep. 22, 2016; 9 pages.
Bonneau J., et al., "Research Perspectives and Challenges for Bitcoin and Cryptocurrencies," International Association for Cryptologic Research, Mar. 19, 2015, 18 pages.
Tschorsch F., et al., "Bitcoin and Beyond: A Technical Survey on Decentralized Digital Currencies," International Association for Cryptologic Research, May 15, 2015, pp. 1-37.
Jesse E Grushack et al: "Union College Currency 3.0: Examining Digital Crypto Currency Markets", Jun. 30, 2014 (Jun. 30, 2014), XP055242356, Retrieved from the Internet: URL: http://antipasto.union.edu/engineering/Archives/SeniorProjects/2014/CS.2014/files/grushacj/grushacj_paper.pdf; 44 pages.
Enas Al Kawasmi et al: "Bitcoin-Based Decentralized Carbon Emissions Trading Infrastructure Model", Systems Engineering, vol. 18, No. 2, Sep. 28, 2014 (Sep. 28, 2014), XP055242445, ISSN: 1098-1241, DOI: 10.1002/sys.21291, Retrieved from the Internet: URL: https://www.researchgate.net/publication/268686553_Bitcoin-Based_Decentralized_Carbon_Emissions_Trading_Infrastructure_Model; 15 pages.
Czepluch et al: "The Use of Block Chain Technology in Different Application Domains", May 20, 2015 (May 20, 2015), XP055242451, Retrieved from the Internet: URL:http://www.lollike.org/bachelor.pdf; 109 pages.
Benders, J., Numerische Mathematik; "Partitioning Procedures for Solving Mixed Variables Programming Problems", 4, 238-252, 1962; 8 pages.
Chaisiri, Lee and Niyato, "Optimization of Resource Provisioning Cost in Cloud Computing" IEEE Transactions on Services Computing, vol. 5, No. 2, Apr.-Jun. 2012); 14 pages.
Extended European Search Report, Application No. 1517944.1, dated Feb. 10, 2016; 6 pages.
International Search Report for corresponding International Application No. PCT/EP2016/052865 dated Mar. 17, 2016; 4 pages.
Written Opinion of the International Searching Authority for corresponding International Application No. PCT/EP2016/052865 dated Mar. 17, 2016; 7 pages.
Antonopoulos, Andreas M., "Mastering Bitcoin—Unlocking digital crypto-currencies," O'Reilly (2014); 282 pages.

(56) References Cited

OTHER PUBLICATIONS

Patel, Harsh, "A block chain based decentralized exchange," International Association for Cryptologic Research (Dec. 18, 2014) vol. 20141225:065012, XP061017563; pp. 1-9.

Combined Search and Examination Report for Great Britain Application No. 1707377.6, dated Nov. 9, 2017, 9 pages.

Combined Search and Examination Report for Great Britain Application No. 1707379.2, dated Nov. 9, 2017, 9 pages.

International Preliminary Report for Application No. PCT/EP2018/061261, dated Nov. 21, 2019, 8 pages.

International Search Report and Written Opinion for Application No. PCT/EP2018/061405, dated Jun. 20, 2018, 12 pages.

International Search Report and Written Opinion for Application No. PCT/EP2018/061406, dated Jun. 20, 2018, 13 pages.

"A Next-Generation Smart Contract and Decentralized Application Platform" Ethereum White Paper, 2016, retrieved from https://github.com/ethereum/wiki/wiki/White-Paper on Nov. 13, 2018, 40 pages.

Adler M., "Threat Intelligence Visibility—the way forward," BT, 2015, available from www.globalservices.bt.com/uk/en/products/assure threat_ monitoring, 8 pages.

Anonymous, "Who Will Protect Users From Ethereum Based Malware? : Ethereum," Mar. 28, 2016, Retrieved from https://www.reddit.com/r/ethereum/comments/4ccfaa/who_will_protect_users_from_ethereum_based_malware/?st=itbp2q49&sh=d8cc4355 on Nov. 13, 2018, 3 pages.

Bakshi, et al., "Securing Cloud from DDOS Attacks Using Intrusion Detection System in Virtual Machine," IEEE, 2010, 5 pages.

Bellifemine, et al., "JADE: A Software Framework for Developing Multi-Agent Applications. Lessons Learned," Elsevier, 2007, 12 pages.

Biryukov A., et al., "R&D in Smart Contracts, Cryptocurrency and Blockchain," University of Luxembourg, Jan. 19, 2016, XP055306767, Retrieved from http://wwwfruni.lu/snt/news_events/speaker_s_presentations on Sep. 29, 2016, pp. 51 pages.

Bitcoin Developer Guide, "Transactions," Retrieved from https://github.com/bitcoin-dot-org.bitcoin.org.bitcoin.org/blob/64e4c549bc5fae480e2f400c052686fd34c8fae/_includes/devdoc/guide_transactions.md, 2017, 10 pages.

Combined search and Examination Report under Sections 17 and 18(3) for Great Britain Application No. 1707376.8, dated Nov. 9, 2017, 8 pages.

Combined search and Examination Report under Sections 17 and 18(3) for Great Britain Application No. 1707378.4, dated Nov. 9, 2017, 11 pages European Search Report for Application No. EP17164006.3, dated Jun. 29, 2017, 6 pages.

Extended European Search Report for Application No. 17170020.6, dated Nov. 10, 2017, 8 pages.

Extended European Search Report for Application No. 17170022.2, dated Nov. 16, 2017, 8 pages.

Extended European Search Report for Application No. 17170024.8, dated Nov. 10, 2017, 10 pages.

Fischer A., et al., "An Introduction to Restricted Boltzmann Machines," in: Progress in Pattern Recognition, Image Analysis, Computer Vision and Applications, vol. 7441 of the series Lecture Notes in Computer Science, 2012, pp. 14-36.

U.S. Appl. No. 16/611,707, filed Nov. 7, 2019, Inventor(s): Ghanea-Hercock.

International Preliminary Report on Patentability for Application No. PCT/EP2015/069670, dated Mar. 16, 2017, 7 pages.

International Preliminary Report on Patentability for Application No. PCT/EP2015/069673, dated Mar. 16, 2017, 9 pages.

International Preliminary Report on Patentability for Application No. PCT/EP2016/067308, dated Feb. 15, 2018, 7 pages.

International Preliminary Report on Patentability for Application No. PCT/EP2016/067309, dated Feb. 15, 2018, 7 pages.

International Preliminary Report on Patentability for Application No. PCT/EP2016/067310, dated Feb. 15, 2018, 8 pages.

International Preliminary Report on Patentability for Application No. PCT/EP2017/055081, dated Oct. 11, 2018, 9 pages.

International Preliminary Report on Patentability for Application No. PCT/EP2017/055082, dated Oct. 11, 2018, 8 pages.

International Preliminary Report on Patentability for Application No. PCT/EP2017/055090, dated Oct. 11, 2018, 10 pages.

International Preliminary Report on Patentability for Application No. PCT/EP2017/055091, dated Oct. 11, 2018, 9 pages.

International Preliminary Report on Patentability for Application No. PCT/EP2018/057674, dated Oct. 10, 2019, 8 pages.

International Preliminary Report on Patentability for Application No. PCT/EP2018/057685, dated Oct. 10, 2019, 9 pages.

International Preliminary Report on Patentability for Application No. PCT/EP2018/057686, dated Oct. 10, 2019, 8 pages.

International Preliminary Report on Patentability for Application No. PCT/EP2018/061405, dated Nov. 21, 2019, 7 pages.

International Preliminary Report on Patentability for Application No. PCT/EP2018/061406, dated Nov. 21, 2019, 8 pages.

International Preliminary Report on Patentability for Application No. PCT/EP2018/061407, dated Nov. 21, 2019, 8 pages.

International Preliminary Report on Patentability for Application No. PCT/EP2018/061408, dated Nov. 21, 2019, 10 pages.

International Preliminary Report on Patentability for Application No. PCT/EP2017/055094, dated Oct. 11, 2018, 8 pages.

International Search Report and Written Opinion for Application No. PCT/EP2015/069670, dated Nov. 11, 2015, 8 pages.

International Search Report and Written Opinion for Application No. PCT/EP2015/069673, dated Nov. 12, 2015, 10 pages.

International Search Report and Written Opinion for Application No. PCT/EP2017/055081, dated Apr. 7, 2017, 11 pages.

International Search Report and Written Opinion for Application No. PCT/EP2017/055082, dated Apr. 26, 2017, 9 pages.

International Search Report and Written Opinion for Application No. PCT/EP2017/055090, dated Jun. 14, 2017, 12 pages.

International Search Report and Written Opinion for Application No. PCT/EP2017/055091, dated Apr. 11, 2017, 11 pages.

International Search Report and Written Opinion for Application No. PCT/EP2017/055094, dated May 15, 2017, 10 pages.

International Search Report and Written Opinion for Application No. PCT/EP2017/055095, dated Apr. 11, 2017, 10 pages.

International Search Report and Written Opinion for Application No. PCT/EP2018/057674, dated May 2, 2018, 10 pages.

International Search Report and Written Opinion for Application No. PCT/EP2018/057685, dated Jun. 1, 2018, 9 pages.

International Search Report and Written Opinion for Application No. PCT/EP2018/057686, dated Apr. 20, 2018, 10 pages.

International Search Report and Written Opinion for Application No. PCT/EP2018/061261, dated Jun. 20, 2018, 13 pages.

International Search Report and Written Opinion for Application No. PCT/EP2018/061407, dated Jun. 20, 2018, 13 pages.

International Search Report and Written Opinion for Application No. PCT/EP2018/061408, dated Jun. 20, 2018, 15 pages.

International Preliminary Report on Patentability for Application No. PCT/EP2017/055095, dated Oct. 11, 2018, 8 pages.

Jin, et al., "A Guest-Transparent File Integrity Monitoring Method in Virtualization Environment," Elsevier, 2010, 11 pages.

Miller A., "The State-of-the-Art of Smart Contracts," FinTech R&D Innovation Conference, Luxemburg, Jan. 19, 2016, Retrieved from URL: http://wwwfr.uni.lu/snt/news_events/speaker_s_presentations on Sep. 29, 2016, 29 pages.

Plohmann D., et al., "Case study of the Miner Botnet," 4th International Conference on Cyber Conflict, Jun. 5, 2012, pp. 345-360.

Search Report dated Nov. 8, 2017 for Great Britain Application No. GB1707381.8, 7 pages.

Sood A.K., et al., "An Empirical Study of HTTP-based Financial Botnets," IEEE Transactions on Dependable and Secure Computing, IEEE Service Center, New York, NY, US, vol. 13 (2), Mar. 2016, pp. 236-251.

Wang Z., "The Applications of Deep Learning on Traffic Identification," 2012, Advances in Neural Information Processing Systems, 2015, 10 pages.

(56) References Cited

OTHER PUBLICATIONS

Wikipedia, "Blockchain (database)—Wikipedia," Nov. 29, 2015, retrieved from https://en.wikipedia.org/w/index.php?title=Block_chain_(database)&oldid=692921608 on Nov. 13, 2018, pp. 1-5.
Wu J., et al., "Hierarchical Temporal Memory Method for Time-Series-Based Anomaly Detection," 2016, IEEE, 16th International Conference Data Mining Workshops, XP033055893, Dec. 12, 2016, pp. 1167-1172.
Zambonelli, et al., "Agent-Oriented Software Engineering for Internet Applications," Coordination of Internet Agents: Models, Technologies, and Applications, Chapter—13, Springer, 2000, 21 pages.
Zupan B., et al., "Machine Learning by Function Decomposition," ICML 1997, Retrieved from https://citeseerx.ist.psu.edu/viewdoc/download?doi=10.1.1.29.4455&rep=rep1&type=pdf on Oct. 17, 2017, 9 pages.
U.S. Appl. No. 16/611,682, filed Nov. 7, 2019, Inventor(s): Ghanea-Hercock as available on Pair at www.uspto.gov.
U.S. Appl. No. 16/611,686, filed Nov. 7, 2019, Inventor(s): Ghanea-Hercock.
U.S. Appl. No. 16/611,694, filed Nov. 7, 2019, Inventor(s): Ghanea-Hercock.
U.S. Appl. No. 16/611,701, filed Nov. 7, 2019, Inventor(s): Ghanea-Hercock.

\* cited by examiner
† cited by third party

VALIDATING COMPUTER RESOURCE USAGE

CROSS-REFERENCE TO RELATED APPLICATIONS

The present application is a National Phase entry of PCT Application No. PCT/EP/052865, filed on 10 Feb. 2016, which claims priority to EP Patent Application No. 15275030.3, filed on 11 Feb. 2015, which are hereby fully incorporated herein by reference.

TECHNICAL FIELD

The present disclosure relates to the validation of computer resource usage. In particular it relates to validation of computer resource usage using a distributed sequential transactional database.

BACKGROUND

Computing resources such as storage, processors, security functions, communication resources such as networking and the like are increasingly provided by "supplier" entities (whether third-party or not) either as literal resources or virtualized resources. The consumption of such resources is increasingly dynamic, on-demand and/or dynamically scalable. Resource providers and consumers in such environments can be unrelated, anonymous, untrusted and/or unknown to each other. A challenge arises for a resource provider in determining whether and when to grant access to restricted resources requested by such consumers that can be considered untrusted. In particular it is necessary for the resource provider to determine whether a particular consumer is identifiable as a consumer that can be irrefutably confirmed to be authorized or entitled to access a resource. This problem is especially acute where there is no relationship between consumers and providers such that the identities of authorized consumers are not known, and there is no commonly agreed authority (such as a centralized service) that can confirm identity or authorization to consume resources. For example, computing environments can be adapted to spawn new and potentially transient consuming entities such as software applications, components and/or agents whose existence cannot be known about and whose existence may be short-lived. Traditional access control is ineffective in such environments. Even where consuming entities purport to relate to a particular identity, or purport to have a particular authorization or authentication, problems exist in confirming such relationship or authorization without recourse to an "all-knowing" centralized server or set of servers. Implementing such a centralized system is itself problematic since a number and disparity of resource providers and consumers required can be enormous and any centralized coordination function can require an untenable degree of scalability and resource.

Accordingly it would be beneficial to provide access control for computing resources without the aforementioned disadvantages.

SUMMARY

The present disclosure accordingly provides, in a first aspect, a computer implemented method for validating use of a computing resource by a requester software component comprising: validating a characteristic of the requester; generating a first transaction defining criteria for consumption of the resource by the requester, the first transaction being encrypted with a private key from a public key/private key pair and being added as part of a block of transactions to a blockchain data structure; generating a subsequent encrypted transaction corresponding to a request of the requester to consume the resource, the subsequent transaction referring to the first transaction, wherein the subsequent transaction is validated by a transaction miner computing component from a plurality of miners by authenticating the transaction using the public key and verifying compliance with the criteria defined in each transaction.

In embodiments, the transaction miner adds the subsequent transaction as part of a block of transactions to the blockchain such that the transaction is verifiable by miners in the plurality of miners.

In embodiments, the criteria includes an authorized extent of consumption of the resource by the requester, and the subsequent transaction includes the criteria having a depleted authorized extent.

In embodiments, the criteria are at least partly provided as executable code for execution by the miner.

In embodiments, the miner retrieves at least one characteristic of the requester from a trusted authority to verify compliance with the criteria.

In embodiments, the computing resource is provided by a resource provider and wherein the miner retrieves at least one characteristic of the provider to verify compliance with the criteria.

In embodiments, the computing resource is provided by a resource provider and wherein the resource provider delays provision of the resource until a time when the block containing the subsequent transaction is confirmed in the blockchain as a valid block.

In embodiments, the first transaction includes a transaction generator as executable program code for generating the subsequent transaction, the transaction generator being further operable to: generate a new key pair including a public key and a corresponding private key; publish the public key for all miners in the plurality of miners; and encrypt the subsequent transaction with the private key of the new key pair, such that the subsequent transaction is verifiably generated by the transaction generator of the first transaction.

In embodiments, the resource provider provides the resource to the requester to an extent corresponding to the extent of depletion of the authorized extent.

In embodiments, the authorized extent is one or more of: a maximum or threshold magnitude of consumption of the resource; a maximum of threshold period of consumption of the resource; and/or a time limit for consumption of the resource.

In embodiments, the at least one characteristic of the provider includes one or more of: a performance characteristic of the provider; a security characteristic of the provider; and/or a release or version of the provider.

In embodiments, validating the characteristic of the requester includes one or more of: authenticating an identity of the requester; verifying a signature of the requester; verifying an authorization status of the requester; verifying a location of the requester; and/or confirming the existence of the requester.

The present disclosure accordingly provides, in a second aspect, a computer system to validate use of a computing resource by a requester software component comprising a processor and a data store wherein the processor is adapted to undertake: validating a characteristic of the requester; generating a first transaction defining criteria for consumption of the resource by the requester, the first transaction being encrypted with a private key from a public key/private key pair and being added as part of a block of transactions to a blockchain data structure; generating a subsequent encrypted transaction corresponding to a request of the requester to consume the resource, the subsequent transaction referring to the first transaction, wherein the subsequent transaction is validated by a transaction miner computing component from a plurality of miners by authenticating the transaction using the public key and verifying compliance with the criteria defined in each transaction.

The present disclosure accordingly provides, in a third aspect, a computing resource consumption computer system adapted to validate use of a computing resource by a requester software component, the system comprising: a validator processing unit validating a characteristic of the requester; a transaction generator processing unit, the transaction generator generating a first transaction defining criteria for consumption of the resource by the requester, the first transaction being encrypted with a private key from a public key/private key pair and being added as part of a block of transactions to a blockchain data structure, wherein in the transaction generator further generates a subsequent encrypted transaction corresponding to a request of the requester to consume the resource, the subsequent transaction referring to the first transaction, wherein the subsequent transaction is validated by a transaction miner computing component from a plurality of miners by authenticating the transaction using the public key and verifying compliance with the criteria defined in each transaction.

The present disclosure accordingly provides, in a fourth aspect, a computer program element comprising computer program code to, when loaded into a computer system and executed thereon, cause the computer to perform the method set out above.

BRIEF DESCRIPTION OF THE DRAWINGS

An embodiment of the present disclosure will now be described, by way of example only, with reference to the accompanying drawings, in which.

DETAILED DESCRIPTION OF EMBODIMENTS

Figure 1:
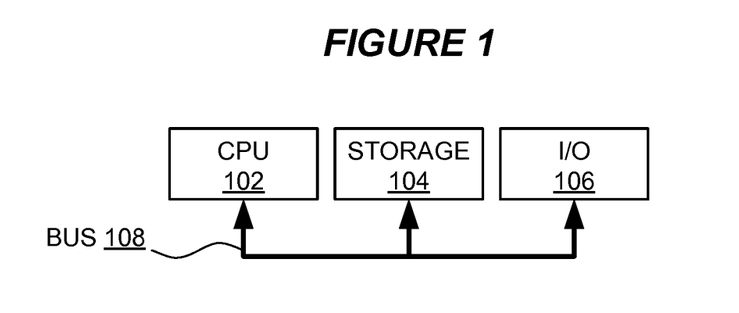
FIG. 1 is a block diagram of a computer system suitable for the operation of embodiments of the present invention.

FIG. 1 is a block diagram of a computer system suitable for the operation of components in embodiments of the present disclosure. A central processor unit (CPU) 102 is communicatively connected to storage 104 and an input/output (I/O) interface 106 via a data bus 108. The storage 104 can be any read/write storage device such as a random access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Figure 2:
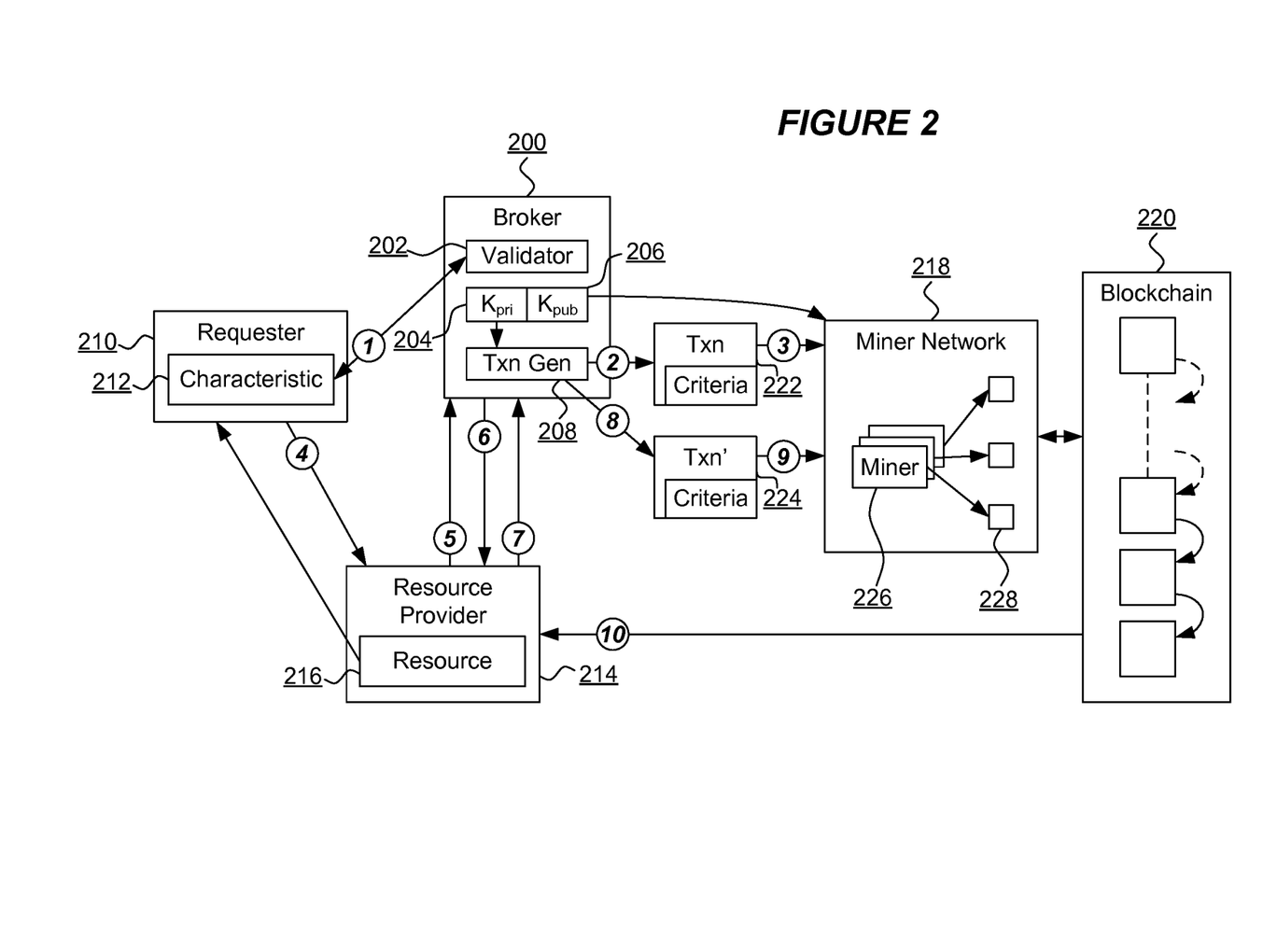
FIG. 2 is a component diagram of an exemplary computer system arrangement in which a requester requests access to a resource provided by a resource provider in accordance with an embodiment of the present disclosure.

FIG. 2 is a component diagram of an exemplary computer system arrangement in which a requester 210 requests access to a resource 216 provided by a resource provider 214 in accordance with an embodiment of the present disclosure.

A requester component 210 is a software, hardware, firmware or combination computing system such as a software application, client, computer terminal application, service requester, enterprise software, virtual or physical machine and alternatives as will be apparent to those skilled in the art. The requester has associated one or more characteristics such as characteristic 212. The characteristic 212 is a feature, aspect, attribute, configuration, quality, faculty, endowment, property, style, membership, classification, value or other characteristic that is or may be relevant to a determination of whether the requester 210 can be or is authorized to access a resource 216. For example, the characteristic 212 can include, inter alia: an identity, identifier, distinctiveness, inclusion or ownership (either owned by or owning), credential or the like; a location whether geographic, within a network, collocation with a resource provider, resource or other entity, or within a virtualized computing environment; an existing or potential facility, service, capability, function or compatibility of or associated with the requester 210 such as a particular technical compatibility including software versioning, library availability, protocol support, encryption standard, security protocol and the like; a degree or level of security provided with, by or available from the requester 210; a level of trust attributed to, judged for, indicated for or determined for the requester 210; a particular system, organizational or other affiliation of the requester; and other characteristics as will be apparent to those skilled in the art.

The requester 210 is a consumer of computing resources available from resource providers such as resource 216 available from resource provider 214. Resource provider 214 is a software, hardware, firmware or combination computing component, including virtual or virtualized computing components such as a virtualized machine, having associated one or more resources such as resource 216 and making the resource 216 available to requesters such as requester 210 where such requesters are authorized or entitled to consume the resource 216 as determined in accordance with embodiments of the present disclosure herein described. For example, the resource provider 214 is a server or service provider computer system offering resources for consumption on-demand, as-required, dynamically or as a service. In one embodiment the resource provider is a cloud computing service provider. The requester 210 and resource provider 216 are directly or indirectly communicably connected such as by way of a computer network such as a wired or wireless network including a local area network, a wide area network, the internet and alternatives as will be apparent to those skilled in the art.

The resource 216 can be any conceivable computing resource consumable by the requester 210 whether by delivery to the requester 210, such as via a communications mechanism linking the requester 210 to the resource provider 214, or by way of consumption of the resource 216 while the resource remains at, with or under the control of the resource provider 214 or some other computer system, virtual machine or environment provided with, in association with or communicatively connected to the resource provider 214, such as a cloud computing resource. For example, the resource 216 can include: storage resources such as virtual or physical storage, memory, disk storage, database storage and the like; processing resource such as a physical or virtual processing system(s) or processor(s), whether co-located or distributed; application resources such as database resources, middleware services, message handling applications or services, transaction processing applications or services, user interface facilities; security facilities such as encryption, monitoring, detection, scanning, proxy, firewall, intrusion detection services and the like; services or applications provided by way of an application programming interface, remote procedure call, remote method invocation, subroutine invocation or other software interface, such as mathematical functions, application specific functions or procedures, object oriented class libraries and/or their implementations such as instantiated objects in execution or synchronized for transfer and the like; media processing functions and/or procedures such as audio, video and multimedia processing functions; communications services, facilities, bandwidth, software, hardware and the like such as access to dedicated or shared communications lines, connections or bandwidth, intermediate network nodes such as routers, switches and proxies, networking services such as physical or virtual network communication, address or name resolution services, gateway services, access point facilities such as wired or wireless network access points, cellular telecommunications services and/or facilities and the like; and any other computing resources useable by the requester 210 and available by a resource provider 214 as will be apparent to those skilled in the art.

The arrangement of FIG. 2 further includes a broker as a software, hardware, firmware or combination component adapted to validate the characteristic 212 of the requester 210 to determine if the requester 210 is, or should be, authorized or eligible to request consumption of resources, whether generic resources, specific resources or resources of a particular class or resource. In this regard the broker 200 includes a validator processing unit 202 as a software, hardware, firmware or combination component adapted to undertake the validation of the characteristic 212 of the requester. Notably the validation by the broker 200 can be independent of any particular resource or class of resource, or can be specific to a particular resource or class of resource whether associated with the broker 200 or requester 210 or identified by the requester 210. Example such validations, by way of example only, include:

the validator 202 being adapted to determine if the requester 210 is capable of supporting security facilities including encryption using a particular encryption algorithm and/or standard as indicated by the characteristic 212, with a positive determination validating the compatibility of the requester 210 such that the requester 210 is validated as being suitable for, authorized or entitled to consume particular or class(es) of resource requiring such security characteristics;

the validator 202 being adapted to determine if the requester 210 is associated with one or more particular identities (or classes of identity) with reference to an identity authentication service, such particular identities being predetermined to be authorized or entitled to consume;

the validator 202 being adapted to determine if the requester 210 satisfies a pre-requisite proof of work requirement, such as the completion of a particular challenge, task, algorithmic procedure with a verifiable output that verifiably confirms work has been done, such as hashing operations to satisfy particular hash characteristics;

the validator 202 being adapted to validate, confirm or verify an exchange of resource has taken place, such exchange directly or indirectly producing an entitlement or authorization of the requester 210 to consume a particular, or particular class of, resource;

the validator 202 being adapted to validate a signature, hash or encrypted object associated with, provided by or constituting the requester 210 or characteristic 212 such as by reference to a public key from a public/private key pair;

the validator 202 being adapted to confirm that the requester 210 exists in, relates to, operates in or is associated with a particular location or class of location(s) such as a geographic, network, system or other location; and/or the validator 202 being adapted to confirm that the requester 210 exists as a discrete, separate, unique and individual entity or group of entities and such as, for example, to confirm that the requester 210 is not a spoof, proxy, intermediary, façade, surrogate or illegitimate entity.

It will be appreciated by those skilled in the art that these examples are not exhaustive and any feature, attribute, capability, identity or other aspect of any characteristic 212 of the requester 210 can form the basis of a validation process undertaken by the validator 202. Further, it will be appreciated that the validator 202 may draw on the services of other internal or external services, components and/or systems to undertake its validation.

The broker 200 further includes a transaction generator 208 as a software, hardware, firmware or combination component adapted to generate transaction data structures representing a validation of the characteristic 212 of the requester 210. Such validation can represent the potential for the requester 210 to consume a resource. The representation of a validation of the characteristic 212 may be characterized by a class, type, category of resource so authorized or alternatively may be devoid of any particular resource indication. In addition to representing the validation of the characteristic 212, each transaction generated by the broker 200 defines criteria for determining whether the requester 210 is authorized or entitled to consume a resource. The determination is contextual in that the determination can only be made when a particular resource, such as resource 216, is considered, proposed or requested for consumption by the requester 210 such that the criteria can be tested. That is to say that a transaction does not necessarily define that a particular resource is authorized for consumption by a particular requester 210. Rather the transaction per se represents validation of the characteristic 212 and defines criteria that, if satisfied, serve to determine that resource consumption is authorized or entitled. Thus an initial transaction 222 is generated by the broker 200 corresponding to the validation of the characteristic 212 of the requester 210. The initial transaction is signed by the broker 200 such as by encryption using a private key 204 from a public key/private key pair. The transaction can thus be confirmed to originate from the broker 200 by any other entity with reference to a public key 206 corresponding to the private key 204.

The criteria of the initial transaction 222 can be any criteria the satisfaction of which serves to verify authorization or entitlement to consume a resource. For example, the criteria can be criteria associated with attributes, characteristics, functions or behaviors of, inter alia: the requester 210; the resource provider 214; the resource 216 itself; services, facilities or resources involved in the prospective resource consumption such as additional, incidental, implied or supplementary resources; the context of the prospective consumption such as a time, location, duration, rate, timeliness or priority (absolute or relative) of the consumption of the resource 216; reference to one or more third parties the authorization of which is required; further checks, verification or validation of the characteristic 212 of the requester 210; or any other features of the resource 216, requester 210, characteristic 212, resource provider 214 or other resources or facilities associated therewith. For example, the transaction can define:

- a requirement that the resource 216 satisfies a particular security standard such as a standard of encryption;
- a requirement that the resource provider 214 provides the resource 216 with a particular level of performance, such as particular speed, throughput, accuracy and the like;
- a requirement that the requester 210 consumes the resource 216 to a threshold extent such as up to a maximum extent or above a minimum extent, for example a maximum amount of storage in a data storage resource, a minimum network data rate in a communication resource, consuming the resource 216 for a maximum amount of time, requesting consumption of the resource with a particular degree of timeliness, and the like; and/or
- a requirement that the requester 210 consumes the resource 216 only to a maximum extent corresponding to an extent of exchange of resource by the requester 210, for example where the requester 210 provides resources such as computing resources in exchange for resources of the resource provider 214 the extent of consumption of the resource provider's resources is limited to the extent of provision of the requester's resources.
- the validator 202 being adapted to validate, confirm or verify an exchange of resource has taken place, such exchange directly or indirectly producing an entitlement or authorization of the requester 210 to consume a particular, or particular class of, resource.

It will be appreciated that any suitable criteria for determining authorization or entitlement to consume the resource 216 can be defined by transactions generated by the broker 20. Further, a transaction can define criteria with no indication of a particular resource for consumption. Where there is no such resource indication, a resource provider 214 can be operable to subjectively interpret any indication of a state of authorization encoded in a transaction in the context of the resource provider 214 to determine a state of authorization in context for the provider 214.

In one embodiment the criteria include an authorized extent of consumption of the resource 216 such that consumption by the requester 210 serves to deplete the authorized extent of consumption. Accordingly consumption by the requester 210 and depletion of an authorized extent of consumption are indicated by one or more additional transactions 224 occurring subsequent to the initial transaction 222. A subsequent transaction 224 includes criteria reflecting any depletion in an extent of authorized consumption. For example, where an initial transaction 222 defines criteria requiring an extent of consumption of a resource up to a maximum extent and some portion of that extent is consumed by the requester 210, a subsequent transaction 224 will define criteria reflecting the extent of consumption by, for example a different maximum extent corresponding to the remaining extent after existing consumption. Thus, where an extent of consumption of a resource is defined to be limited to one hour of time in an initial transaction and the requester consumes 30 minutes, a subsequent transaction can represent a remaining extent limited to 30 minutes (the balance of the unconsumed extent). Thus transactions generated by the broker 200 form the basis of sharing, validating and accounting the requester's 210 authorization to consume resources in a manner that serves to assure authorization to consume and precludes repudiation of consumption. Accordingly a validation of a characteristic 212 of the requester 210 and any resource (or class of resource) consumption criteria are encoded in transactions generated by the broker 200.

Transaction generator 208 can generate an initial transaction 222 at the request of the requester 210 and subsequent transactions 224 for each consumption of the resource 216. Thus the transactions 222, 224 form a transaction sequence mapping the consumption by the requester 210 of resources. To provide reliability and certainty for the resource provider 214 that all transactions are valid, up-to-date and that there is no repudiation of transactions occurring from false-accounting and the like, all transactions must be verified both in themselves (i.e. their origin and authenticity) and as a sequence of transactions (i.e. that no transaction is repudiated, deleted, reused, undone etc.) To achieve this, embodiments of the present disclosure employ a distributed sequential transactional database, hereinafter a blockchain 220, with a network 218 of miner entities 226 to validate all transactions in a reliable and verifiable manner.

Distributed sequential transactional databases are well known in the field of cryptocurrencies and are documented, for example, in "Mastering Bitcoin. Unlocking Digital Crypto-Currencies." (Andreas M. Antonopoulos, O'Reilly Media, April 2014). For convenience, such a database is herein referred to as a blockchain 220 though it will be appreciated that other suitable databases, data structures or mechanisms possessing the characteristics essential for embodiments of the present disclosure could alternatively be used. The blockchain 220 is a distributed chain of block data structures accessed by a network of nodes, referred to here as a miner network 218. Each block in the blockchain 220 includes a plurality of transaction data structures, each transaction referring or relating to a prior transaction. For example, in one embodiment each blockchain includes a Merkle of hash or digest values for transactions included in the block to arrive at a hash value for the block, which is itself combined with a hash value for a preceding block to generate a chain of blocks (blockchain). A new block of transactions is added to the blockchain by miner 226 software, hardware, firmware or combination systems in the miner network 218. The miners 226 are communicatively connected to sources of transactions (such as the broker 200) and access or copy the blockchain 220. A miner 226 undertakes validation of the substantive content of a transaction (such as the criteria defined therein) and adds a block of new transactions to the blockchain when a challenge is satisfied, typically such challenge involving a combination hash or digest for a prospective new block and a preceding block in the blockchain and some challenge criterion. Thus miners 226 in the miner network 218 may each generate prospective new blocks 228 for addition to the blockchain 220. Where a miner 226 satisfies or solves the challenge and validates the transactions in a prospective new block such new block is added to the blockchain 220. Accordingly the blockchain 220 provides a distributed mechanism for reliably verifying a data entity such as an entity constituting or representing the potential to consume a resource.

The detailed operation of such blockchains and the function of miners 226 in the miner network 218 is beyond the scope of this specification. The manner in which a blockchain 220 and network 218 of miners 226 operate ensures that only valid transactions are added within blocks to the blockchain 220 in a manner that is persistent within the blockchain 220. Transactions added erroneously or maliciously are not verifiable by other miners 226 in the network 218 and cannot persist in the blockchain. This attribute of blockchains is exploited by embodiments of the present invention to provide a distributed and reliable assurance for a resource provider 214 that resource consumption by a requester 210 is authorized or entitled. Thus transactions generated by the broker 200 are passed to the miner network 218 for validation by miners 226 as prospective new blocks 228. Validated blocks are added to the blockchain 220 by the miner network 218. Blocks added to the blockchain 220 that are invalid (due to error or malice) do not persist in the blockchain in favor or blocks verifiable by other miners in the network 218. Thus after a period of time (the length of which can be tailored by, for example, adapting the complexity of the challenge required to demonstrate proof of work by the miners 226 as part of the creation of new blocks), a new block is confirmed in the blockchain 220 at which time the resource provider 214 can operate with certainty that transactions in the confirmed block are valid and verifiable. Thus in some embodiments the resource provider 214 may delay provision of the resource 216 to the requester 210 until a time when a block containing a transaction 224 for consumption of the resource 216 is confirmed in the blockchain 220 as a valid block.

Thus, in this way, embodiments of the present disclosure provide for the confirmation of authorization or entitlement of the requester 210 to consume the resource 216 in a verifiable manner by way of a blockchain 220 and the plurality of miners 226. The authorization is validated and cannot be repudiated and provides certainty to the resource provider 214 even where the resource provider 214 has no relationship with or knowledge of the requester 210 or requester characteristics. The validation of the characteristics of the requester 210 are encoded in the initial transaction 222 along with a definition of criteria for consumption of the resource 216 that are tested and verified at the point and in the context of consumption of the resource 216. Thus considerable decoupling is provided between the requester 210, the resource provider 214 and the consumption validation process undertaken by the miners 226 with reference to the blockchain 220 allowing these entities to operate in environments where the existence of any or each of these entities is transient, variable, untrusted or otherwise dynamic.

The process for consumption of the resource 216 by the requester 210 will now be considered with reference to FIG. 2 and the activities numbered in ellipses in the FIG. which are referenced here in parentheses. Initially (1) the requester 210 requests validation of its characteristic 212 with the validator 202 of the broker 200. The validator 202 validates the characteristic 212 which may be undertaken with reference to external or internal services or features such as authorities and the like. To the extent that the requester's characteristic 212 is validated, the transaction generator 208 generates (2) an initial (first) transaction 222 representing the validation of the requester's characteristic 212. The nature, type and/or extent of validation of the characteristic 212 may be encoded, written, indicated or provided within or with the transaction 222. Alternatively, the nature, type and/or extent of validation of the characteristic 212 may be implied or indicated by the broker 200 itself or the validator 202 itself, either or both of which may specifically advertise, label or indicate itself as a particular type of validator. In some embodiments the nature of the broker 200 or validator 202 is included in or associated with the transaction 222. Thus, where the validator 202 is specifically a user authenticator then transactions generated by the broker 200 on the basis of such validations are inherently representative of authenticated users, for example.

The initial transaction 222 further defines criteria for consumption of resources by the requester 210. Such criteria can be based on an extent or certainty of the validation undertaken by the validator 202 or a finding of the validator 202. For example, where the validator 202 determines that the requester 210 is operating in an insecure network environment based on network characteristics 212 of the requester 210, the transaction generator 208 can define criteria in the initial transaction 222 requiring any resource consumption involving the communication of data is provided with data encryption. Multiple criteria can be included in the transaction 222. The initial transaction is digitally signed by the broker 200 and subsequently published (3), communicated or otherwise provided to or accessed by miners 226 in the miner network 218 for validation and inclusion in a new block of the blockchain 220.

Transactions generated by the transaction generator 208 are associated with the requester 210 such that requester 210 and a corresponding transaction are associated with each other. In one embodiment the requester 210 has associated a unique address, such as a long numerical address, and the transactions refer to the requester's address either explicitly or by way of a hash or digest of the address. In this way the broker 200, miners 226, resource provider 214 and requester 210 can identify transactions in the blockchain 220 relating to the requester 210. Such information regarding the consumption of resources by the requester 210 is therefore inherently relatively public (depending on the extent to which the system of FIG. 2 is public) or at least broadly available within the system of FIG. 2. In one embodiment further privacy is provided for the resource consumption activities and behaviors of the requester 210 by providing the requester with multiple, potentially many, potentially unrelated addresses with which the requester can validate via the broker 200 and consume resources.

The requester 210 requests (4) consumption of the resource 216 providing the requester's address. The resource provider 214 initially requests (5) confirmation from the broker 200 that the requester's address has associated a valid transaction representing a current state of validation by the broker 200. The broker 200 checks a most recent transaction in the blockchain 200 associated with the requester's address to validate the requester 210. Such validation can include verifying that the most recent transaction for the requester's address is properly signed (with reference to the public/private key pair 204, 206). In some embodiments the validation can extend to checking that the requester's most recent transaction does not exhaust any extent of authorization or entitlement to consume the (or any) resource 216. The results of the validation by the broker 200 are provided (6) to the resource provider 214.

Responsive to the requester validation by the broker 200, the resource provider 214 requests (7) the broker 200 generate a new (subsequent) transaction 224 corresponding to consumption, by the requester 210, of the resource 216.

The request can include an extent or anticipated extent of consumption of the resource 216 in order that such extent can be reflected in the subsequent transaction 224. The broker generates (8) the subsequent transaction 224 including criteria based on criteria for the initial transaction 222. The criteria for the subsequent transaction 224 can be adapted to reflect any depletion of an extent of authorization of consumption, or other criteria changes resulting from the consumption of a resource. The subsequent transaction 224 is digitally signed by the broker 200 and subsequently published (3), communicated or otherwise provided to or accessed by miners 226 in the miner network 218 for validation and inclusion in a new block of the blockchain 220.

The resource provider 214 uses confirmation of a new block in the blockchain 220 containing the subsequent transaction 224 as basis for allowing consumption of the resource 216 by the requester 210. The extent of consumption may be limited or constrained depending on indications the resource provider 214 supplied to the broker 200 when requesting generation of the subsequent transaction 224 (e.g. the anticipated extent of consumption).

Figure 3:
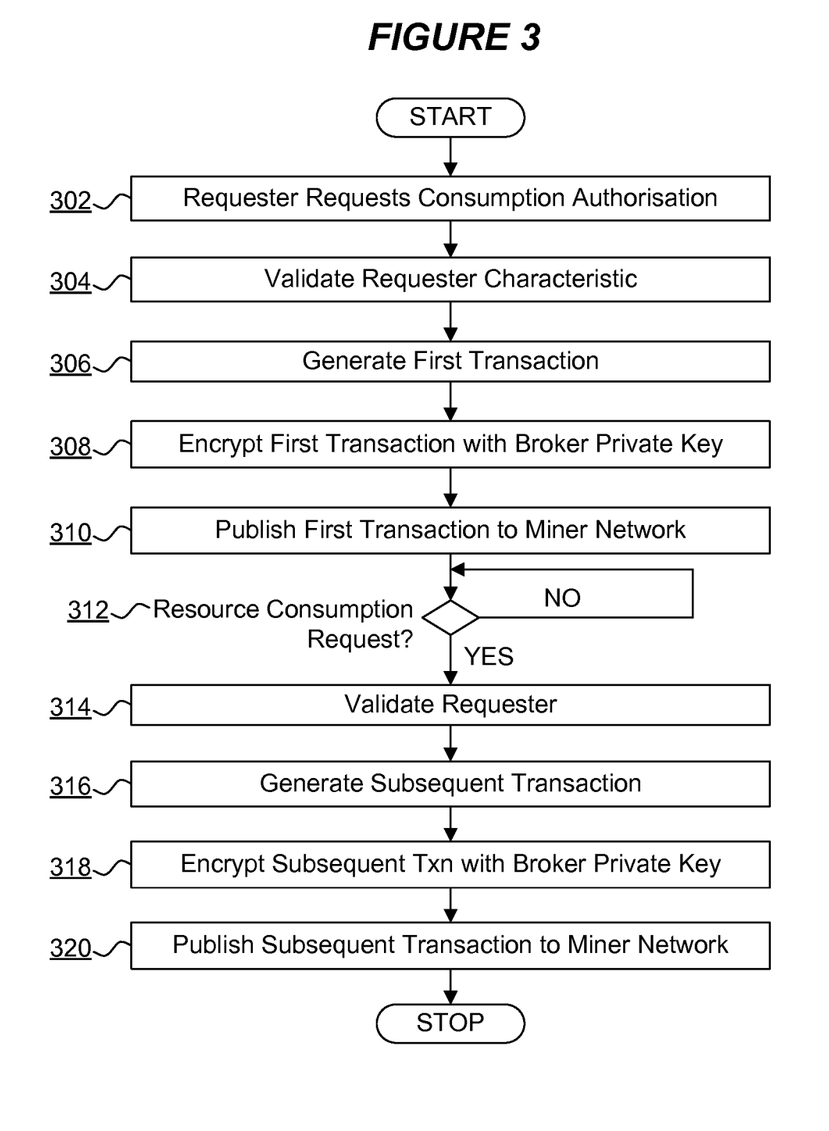
FIG. 3 is a flowchart of an exemplary method of the broker of FIG. 2 in accordance with an embodiment of the present disclosure.

FIG. 3 is a flowchart of an exemplary method of the broker 200 of FIG. 2 in accordance with an embodiment of the present disclosure. Initially at 302 the broker 200 receives a request for authorization to consume the (or a) resource. At 304 the validator 202 validates the requester characteristic 212. At 306 the first transaction 222 is generated and signed by, for example, encryption with the broker's private key 204 at 308. At 310 the first transaction 222 is published to the miner network 218 for validation by a miner 226 and inclusion in a new block in the blockchain 220. If a resource consumption request is received from the resource provider 214 at 312 the method proceeds to validate the requester 210 at 314. At 316 the subsequent transaction 224 is generated and signed at 318. At 320 the subsequent transaction 224 is published to the miner network 218 for validation by a miner 226 and inclusion in a new block in the blockchain 220.

Figure 4:
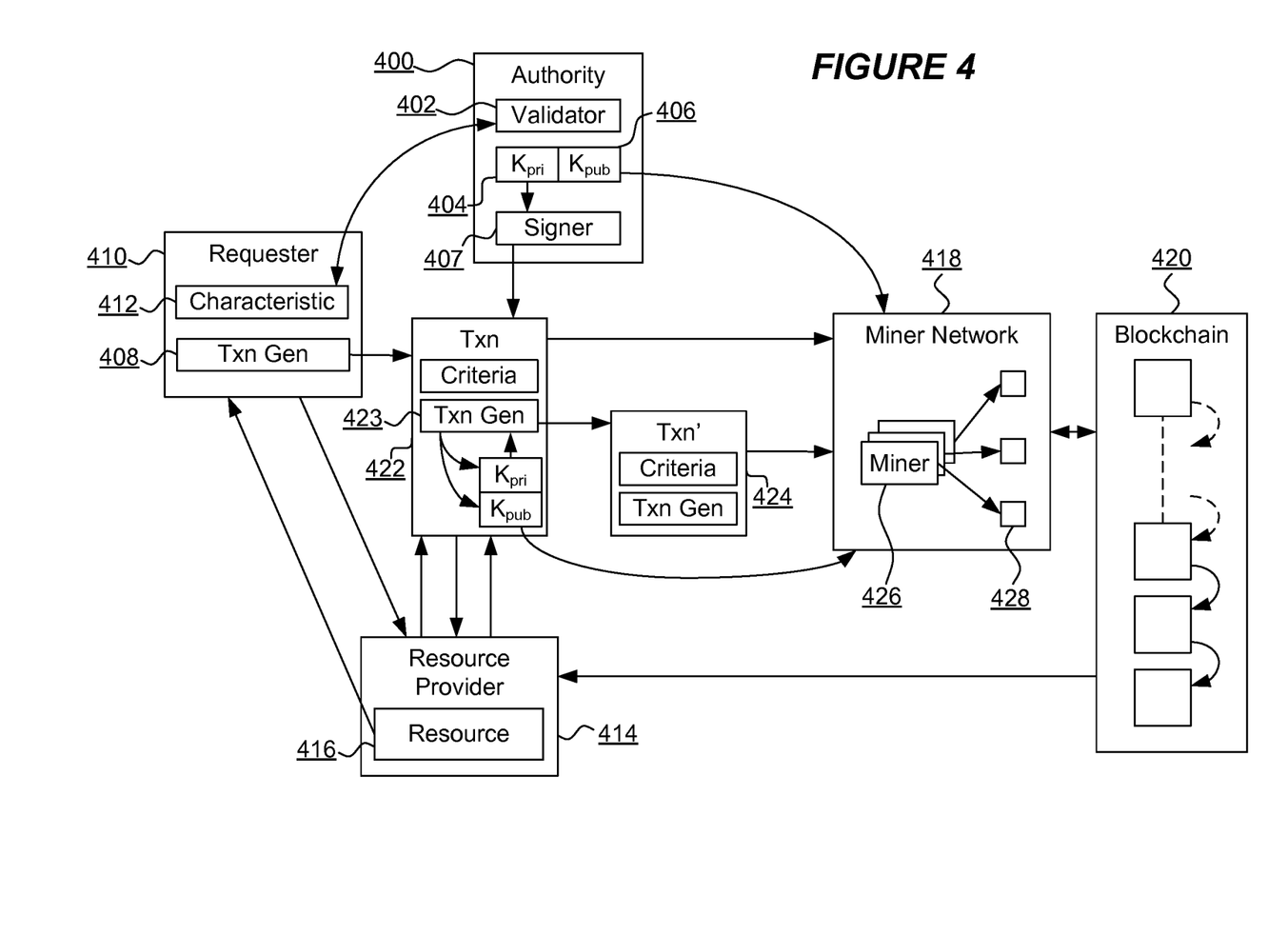
FIG. 4 is a component diagram of an alternative exemplary computer system arrangement in which a requester requests access to a resource provided by a resource provider in accordance with an embodiment of the present disclosure.

FIG. 4 is a component diagram of an alternative exemplary computer system arrangement in which a requester 410 requests access to a resource 416 provided by a resource provider 414 in accordance with an embodiment of the present invention. Many of the features and components of FIG. 4 are identical to those described above with respect to FIG. 2 and these will not be repeated here. The system of FIG. 4 differs from that of FIG. 2 by the absence of a dedicated broker 200. In the arrangement of FIG. 4 the requester 410 includes a transaction generator 408 for generating initial transaction 422. While the initial transaction 422 is generated by the requester 410 itself, an authority component provides a validator 402 for validating the characteristic 412 of the requester 410 substantially as hereinbefore described. The authority is also operable to sign the initial transaction 422 by way of a signer 407 software or hardware component, for example using a public/private key pair 404, 406 of the authority. Thus, on the basis of the validation by validator 402 and the signing by signer 407 the initial transaction 422 constitutes a representation of the validation of the validator 402 consistent with the initial transaction of FIG. 2 described above.

In the arrangement of FIG. 4 each transaction in a sequence of transactions for the requester's consumption of the resource 416 is adapted to generate a subsequent transaction corresponding to such consumption without recourse to a broker. Thus the initial transaction 422 additionally includes a transaction generator 423 as a software component operable to generate a subsequent transaction 424. The transaction generator 423 is further operable to undertake the secure generation of a new public/private key pair for digitally signing the subsequent transaction 424. Thus the subsequent transaction 424 can be verifiably attributed to the initial transaction 422 by way of the digital signature of the transaction generator 423, and the initial transaction can be verifiably attributed to the authority component 400 by way of the digital signature of the signer 407. Accordingly the progeny of each transaction can be traced back to the authority without a need for a broker.

The transaction 422 also can include logic to undertake requester validation in response to a request from the resource provider 414 as hereinbefore described such that the transaction generator can validate that a requester has associated a signed transaction in a verified block in the blockchain 420. To this end the resource provider 414 or requester 410 may obtain the most recent transaction from the blockchain 420 based on an address of the requester in order to undertake such a request to the transaction for the requester validation.

The transaction 422 further includes logic, such as part of the transaction generator 423, to undertake the publication, communication, transmission or otherwise making available of a subsequent transaction 424 to the miner network 418 of miners 426 for verification and inclusion by a miner 426 in a new block of the blockchain 420. Notably, each subsequent transaction 424 also includes the logic of the transaction 422 such that transactions themselves adopt substantially the role of the broker of FIG. 2 in respect of the generation and signing of subsequent transactions.

Figure 5:
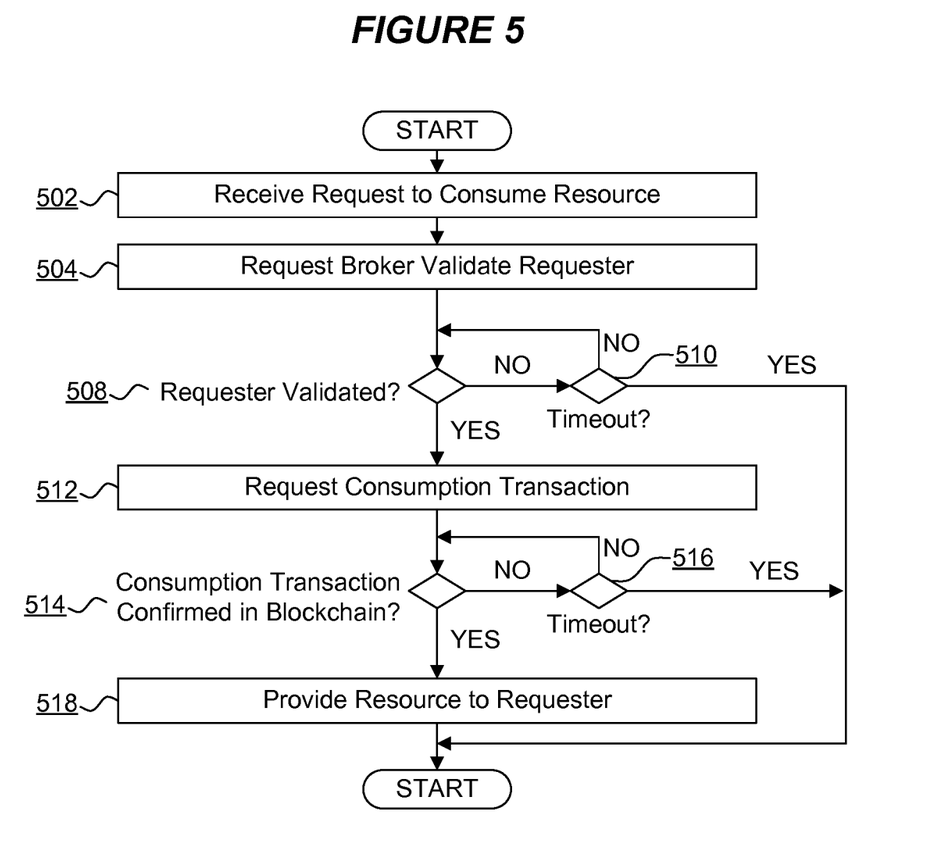
FIG. 5 is a flowchart of an exemplary method of the resource provider of FIG. 2 or FIG. 3 in accordance with an embodiment of the present disclosure.

FIG. 5 is a flowchart of an exemplary method of the resource provider 214, 414 of FIG. 2 or FIG. 3 in accordance with an embodiment of the present disclosure. Initially, at 502, the resource provider 214, 414 receives a request to consume the resource 216, 416 from a requester 210, 410. At 504 the provider 214, 414 requests that the broker 200 (or initial or latest transaction 422 in the arrangement of FIG. 4) validate the requester 210, 410. The method loops at 508 and 510 until the requester 210, 410 is validated or a predefined timeout period elapses. Where the requester 210, 410 is validated the method requests a new (subsequent) consumption transaction 214, 414 at 512. The method loops at 514 and 516 until the new consumption transaction 214, 414 is confirmed in the blockchain 220, 420 or a predefined timeout period elapses. Where the new consumption transaction 214, 414 is confirmed in the blockchain 220, 420, the method proceeds to provide the resource 216, 416 to the requester 210, 410 for consumption at 518.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example.

Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure.

It will be understood by those skilled in the art that, although the present invention has been described in relation to the above described example embodiments, the invention is not limited thereto and that there are many possible variations and modifications which fall within the scope of the invention.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A computer implemented method for validating use of a computing resource by a requester software component comprising:
   validating a characteristic of the requester software component requesting use of a computing resource;
   generating a first transaction defining criteria for consumption of the computing resource by the requester software component, the first transaction being encrypted with a private key from a public key/private key pair and being added as part of a block of transactions to a blockchain data structure; and
   generating a subsequent encrypted transaction corresponding to a request of the requester software component to consume the computing resource, the subsequent transaction referring to the first transaction,
   wherein the subsequent transaction is validated by a transaction miner computing component from a plurality of miners by authenticating the subsequent transaction using the public key and verifying compliance with the criteria defined in each transaction, and
   wherein the criteria includes an authorized extent of consumption of the computing resource by the requester software component, and the subsequent transaction includes the criteria having a depleted authorized extent.

2. The method of claim 1 wherein the transaction miner adds the subsequent transaction as part of a block of transactions to the blockchain such that the transaction is verifiable by miners in the plurality of miners.

3. The method of claim 2 wherein the computing resource is provided by a resource provider and wherein the resource provider delays provision of the computing resource until a time when the block containing the subsequent transaction is confirmed in the blockchain as a valid block.

4. The method of claim 1 wherein the criteria are at least partly provided as executable code for execution by the miner.

5. The method of claim 1 wherein the miner retrieves at least one characteristic of the requester software component from a trusted authority to verify compliance with the criteria.

6. The method of claim 1 wherein the computing resource is provided by a resource provider and wherein the miner retrieves at least one characteristic of the resource provider to verify compliance with the criteria.

7. The method of claim 6 wherein the at least one characteristic of the resource provider includes one or more of: a performance characteristic of the resource provider; a security characteristic of the resource provider; or a release or version of the resource provider.

8. The method of claim 1 wherein the first transaction includes a transaction generator as executable program code for generating the subsequent transaction, the transaction generator being further operable to:
   generate a new key pair including a public key and a corresponding private key;
   publish the public key for all miners in the plurality of miners; and
   encrypt the subsequent transaction with the private key of the new key pair,
   such that the subsequent transaction is verifiably generated by the transaction generator of the first transaction.

9. The method of claim 1 wherein the resource provider provides the computing resource to the requester software component to an extent corresponding to the extent of depletion of the authorized extent.

10. The method of claim 1 wherein the authorized extent is one or more of: a maximum or threshold magnitude of consumption of the computing resource; a maximum of threshold period of consumption of the computing resource; or a time limit for consumption of the computing resource.

11. The method of claim 1 wherein validating the characteristic of the requester software component includes one or more of: authenticating an identity of the requester software component; verifying a signature of the requester software component; verifying an authorization status of the requester software component; verifying a location of the requester software component; or confirming the existence of the requester software component.

12. A computer system to validate use of a computing resource by a requester software component comprising:
   a processor and a data store, wherein the processor is configured to:
      validate a characteristic of the requester software component requesting use of a computing resource;
      generate a first transaction defining criteria for consumption of the computing resource by the requester software component, the first transaction being encrypted with a private key from a public key/private key pair and being added as part of a block of transactions to a blockchain data structure; and
      generate a subsequent encrypted transaction corresponding to a request of the requester software component to consume the computing resource, the subsequent transaction referring to the first transaction,
   wherein the subsequent transaction is validated by a transaction miner computing component from a plurality of miners by authenticating the subsequent transaction using the public key and verifying compliance with the criteria defined in each transaction, and
   wherein the criteria includes an authorized extent of consumption of the computing resource by the requester software component, and the subsequent transaction includes the criteria having a depleted authorized extent.

13. A non-transitory computer-readable storage medium storing a computer program element comprising computer program code to, when loaded into a computer system and executed thereon, cause the computer to perform a method for validating use of a computing resource by a requester software component comprising:

validating a characteristic of the requester software component requesting use of a computing resource;

generating a first transaction defining criteria for consumption of the computing resource by the requester software component, the first transaction being encrypted with a private key from a public key/private key pair and being added as part of a block of transactions to a blockchain data structure; and     generating a subsequent encrypted transaction corresponding to a request of the requester software component to consume the computing resource, the subsequent transaction referring to the first transaction,     wherein the subsequent transaction is validated by a transaction miner computing component from a plurality of miners by authenticating the subsequent transaction using the public key and verifying compliance with the criteria defined in each transaction, and     wherein the criteria includes an authorized extent of consumption of the computing resource by the requester software component, and the subsequent transaction includes the criteria having a depleted authorized extent.

\* \* \* \* \*